US011858188B2

(12) United States Patent
Aoki

(10) Patent No.: US 11,858,188 B2
(45) Date of Patent: Jan. 2, 2024

(54) INJECTION METHOD AND INJECTION APPARATUS FOR MOLTEN RESIN, AND INJECTION STRETCH BLOW MOLDING MACHINE USING INJECTION APPARATUS

(71) Applicant: Aoki Technical Laboratory, Inc., Nagano (JP)

(72) Inventor: Shigeto Aoki, Nagano (JP)

(73) Assignee: Aoki Technical Laboratory, Inc.

( * ) Notice: Subject to any disclaimer, the term of this patent is extended or adjusted under 35 U.S.C. 154(b) by 0 days.

(21) Appl. No.: 17/322,961

(22) Filed: May 18, 2021

(65) Prior Publication Data

US 2021/0362385 A1 Nov. 25, 2021

(30) Foreign Application Priority Data

May 19, 2020 (JP) .................................. 2020-087318

(51) Int. Cl.
*B29C 45/18* (2006.01)
*B29C 45/50* (2006.01)
*B29C 45/46* (2006.01)

(52) U.S. Cl.
CPC .............. *B29C 45/50* (2013.01); *B29C 45/18* (2013.01); *B29C 45/461* (2013.01); *B29C 2045/1875* (2013.01)

(58) Field of Classification Search
CPC ... B29C 45/461; B29C 45/462; B29C 45/463; B29C 45/50; B29C 45/5092
See application file for complete search history.

(56) References Cited

U.S. PATENT DOCUMENTS

| 8,485,810 B2 | 7/2013 | Mathy, Jr. et al. |
| 8,673,204 B2 | 3/2014 | Aoki et al. |
| 9,475,243 B2 | 10/2016 | Aoki et al. |

(Continued)

FOREIGN PATENT DOCUMENTS

| CN | 107787270 A | 3/2018 |
| JP | S5026578 B1 | 9/1975 |

(Continued)

OTHER PUBLICATIONS

Office Action and Examination Search Report dated Aug. 11, 2021 for corresponding Canada Application No. 3,119,151; consisting of 3-pages.

(Continued)

*Primary Examiner* — Armand Melendez
(74) *Attorney, Agent, or Firm* — Christopher & Weisberg, P.A.

(57) ABSTRACT

An injection apparatus is configured to feed a molten resin into an injection molding section of an injection stretch blow molding machine. The injection apparatus uniformly melts a resin material while the duration from the time of starting plasticizing and kneading till completion of injection is shortened, thereby allowing the operation of the injection apparatus to fall within the time corresponding to the reduced injection molding process in the injection stretch blow molding machine. Thus, the molding cycle for a hollow body is reduced. In this context, at the start of the filling for each injection cycle, the injection apparatus starts plasticizing and kneading for generating the molten resin for injection in the next injection cycle.

2 Claims, 7 Drawing Sheets

(56) References Cited

U.S. PATENT DOCUMENTS

| | | |
|---|---|---|
| 2005/0161847 A1 | 7/2005 | Weatherall et al. |
| 2012/0132608 A1 | 5/2012 | Aoki et al. |
| 2014/0190924 A1 | 7/2014 | Aoki et al. |
| 2018/0079122 A1 | 3/2018 | Aoki et al. |
| 2018/0169921 A1* | 6/2018 | Schiffers ................. B29C 45/62 |

FOREIGN PATENT DOCUMENTS

| | | |
|---|---|---|
| JP | H041021 A | 1/1992 |
| JP | H06179238 A | 6/1994 |
| JP | H09109200 A | 4/1997 |
| JP | H11207792 A | 8/1999 |
| JP | 2005022109 A | 1/2005 |
| JP | 2011037139 A | 2/2011 |
| JP | 4833081 B2 | 12/2011 |
| WO | 2005070649 A1 | 8/2005 |

OTHER PUBLICATIONS

Korean Office Action dated Sep. 6, 2021, for corresponding Korean Application No. 10-2021-0062597; consisting of 6-pages.
European Search Report dated Oct. 15, 2021, for corresponding European Application No. 21173981.8; consisting of 4-pages.
European Office Action dated Oct. 27, 2021, for corresponding European Application No. 21173981.8; consisting of 8-pages.
The State Intellectual Property Office of China, Notification of the First Office Action for corresponding CN Application No. 202110518139.5, dated Mar. 22, 2022, 12 pages.
Canadian Intellectual Property Office, Notification of the Second Office Action for corresponding CA Application No. 3,119,151, dated Feb. 22, 2022, 4 pages.

\* cited by examiner

PRACTICAL EXAMPLE
VARIATION IN WEIGHT OF MOLDED ARTICLES FOR THREE CONSECUTIVE SHOTS
(NINE IN TOTAL) FOR EACH LIP MOLD

UNIT: gram

|  | 1A | 1B | 1C | 1D |
|---|---|---|---|---|
| FIRST | 96.2 | 96.2 | 96.5 | 96.4 |
| SECOND | 96.2 | 96.3 | 96.5 | 96.4 |
| THIRD | 96.2 | 96.3 | 96.5 | 96.4 |
| MAXIMUM DIFFERENCE | 0.0 | 0.1 | 0.0 | 0.0 |

|  | 2A | 2B | 2C | 2D |
|---|---|---|---|---|
| FIRST | 96.3 | 96.4 | 96.5 | 96.4 |
| SECOND | 96.3 | 96.4 | 96.4 | 96.4 |
| THIRD | 96.2 | 96.3 | 96.4 | 96.4 |
| MAXIMUM DIFFERENCE | 0.1 | 0.1 | 0.1 | 0.0 |

|  | 3A | 3B | 3C | 3D |
|---|---|---|---|---|
| FIRST | 96.3 | 96.4 | 96.4 | 96.4 |
| SECOND | 96.2 | 96.3 | 96.4 | 96.4 |
| THIRD | 96.3 | 96.4 | 96.5 | 96.4 |
| MAXIMUM DIFFERENCE | 0.1 | 0.1 | 0.1 | 0.0 |

PRACTICAL EXAMPLE   MOTOR DATA
VARIATION IN NINE CONSECUTIVE SHOTS AMONG BOTTLES

UNIT: second

|  | METERING TIME (AFTER COMPLETION OF INJECTION) | CYCLE TIME | FILLING TIME | TIME BETWEEN COMPLETION OF METERING AND START OF INJECTION |
|---|---|---|---|---|
| 13:49:56 | 8.26 | 14.88 | 1.75 | 1.06 |
| 13:50:10 | 8.31 | 14.89 | 1.75 | 1.00 |
| 13:50:25 | 8.32 | 14.89 | 1.75 | 1.02 |
| 13:50:40 | 8.42 | 14.92 | 1.75 | 0.88 |
| 13:50:55 | 8.35 | 14.92 | 1.75 | 1.00 |
| 13:51:10 | 8.29 | 14.92 | 1.75 | 1.04 |
| 13:51:25 | 8.37 | 14.91 | 1.75 | 0.97 |
| 13:51:40 | 8.33 | 14.93 | 1.75 | 1.00 |
| 13:51:55 | 8.24 | 14.89 | 1.75 | 1.08 |
| AVERAGE | 8.32 | 14.91 | 1.75 | 1.01 |
| MAXIMUM TIME DIFFERENCE | 0.18 | 0.05 | 0.00 | 0.20 |

PRACTICAL EXAMPLE   BARREL TEMPERATURE
(AT THE TIME OF COLLECTING BOTTLES FOR INSPECTION)
BARREL SET TEMPERATURE – NOZZLE 280°C, F SECTION 280°C, M SECTION 280°C, R SECTION 270°C

|  | BARELL NOZZLE | BARREL F SECTION | BARREL M SECTION | BARREL R SECTION |
|---|---|---|---|---|
| 13:48:42 | 273 | 286 | 280 | 270 |
| COLLECT BOTTLE 13:49:42 | 273 | 286 | 280 | 270 |
| COLLECT BOTTLE 13:50:42 | 273 | 286 | 280 | 270 |
| COLLECT BOTTLE 13:51:42 | 274 | 285 | 280 | 270 |
| COLLECT BOTTLE 13:52:42 | 273 | 285 | 280 | 270 |
| 13:53:42 | 273 | 285 | 280 | 270 |

FIG. 6

COMPARATIVE EXAMPLE  NUMBER OF SCREW REVOLUTIONS 38RPM  CYCLE TIME 18.1 second
VARIATION IN WEIGHT OF MOLDED ARTICLES FOR THREE CONSECUTIVE SHOTS (NINE IN TOTAL)
FOR EACH LIP MOLD UNIT: gram

|  | 1A | 1B | 1C | 1D |
|---|---|---|---|---|
| FIRST | 96.4 | 96.5 | 96.6 | 96.5 |
| SECOND | 96.3 | 96.5 | 96.6 | 96.5 |
| THIRD | 96.3 | 96.5 | 96.6 | 96.5 |
| MAXIMUM DIFFERENCE | 0.1 | 0.0 | 0.0 | 0.0 |

|  | 2A | 2B | 2C | 2D |
|---|---|---|---|---|
| FIRST | 96.4 | 96.5 | 96.7 | 96.5 |
| SECOND | 96.4 | 96.5 | 96.6 | 96.4 |
| THIRD | 96.3 | 96.5 | 96.6 | 96.5 |
| MAXIMUM DIFFERENCE | 0.1 | 0.0 | 0.1 | 0.1 |

|  | 3A | 3B | 3C | 3D |
|---|---|---|---|---|
| FIRST | 96.4 | 96.5 | 96.6 | 96.5 |
| SECOND | 96.4 | 96.5 | 96.6 | 96.5 |
| THIRD | 96.3 | 96.5 | 96.6 | 96.5 |
| MAXIMUM DIFFERENCE | 0.1 | 0.0 | 0.0 | 0.0 |

COMPARATIVE EXAMPLE  NUMBER OF SCREW REVOLUTIONS 38RPM  CYCLE TIME 18.1 second
VARIATION IN NINE CONSECUTIVE SHOTS AMONG BOTTLES UNIT: second

|  | METERING TIME (AFTER COMPLETION OF INJECTION) | CYCLE TIME | FILLING TIME | TIME BETWEEN COMPETION OF METERING AND START OF INJECTION |
|---|---|---|---|---|
| 10:43:09 | 12.00 | 18.15 | 1.73 | 0.40 |
| 10:43:28 | 11.94 | 18.08 | 1.73 | 0.40 |
| 10:43:46 | 12.02 | 18.16 | 1.73 | 0.40 |
| 10:44:04 | 11.97 | 18.13 | 1.73 | 0.40 |
| 10:44:22 | 11.99 | 18.12 | 1.73 | 0.40 |
| 10:44:40 | 11.96 | 18.11 | 1.73 | 0.40 |
| 10:44:58 | 12.00 | 18.16 | 1.73 | 0.40 |
| 10:45:16 | 11.94 | 18.09 | 1.73 | 0.40 |
| 10:45:35 | 12.07 | 18.22 | 1.73 | 0.40 |
| AVERAGE | 11.99 | 18.14 | 1.73 | 0.40 |
| MAXIMUM TIME DIFFERENCE | 0.13 | 0.14 | 0.00 | 0.00 |

MOLDING WITH LONGER CYCLE DUE TO DELAYED METERING↑

COMPARATIVE EXAMPLE  NUMBER OF SCREW REVOLUTIONS 38RPM
(AT THE TIME OF COLLECTING BOTTLES FOR INSPECTION)
BARREL SET TEMPERATURE – NOZZLE 280°C, F SECTION 280°C, M SECTION 280°C, R SECTION 270°C

|  |  | BARELL NOZZLE | BARREL F SECTION | BARREL M SECTION | BARREL R SECTION |
|---|---|---|---|---|---|
|  | 10:42:46 | 273 | 282 | 280 | 270 |
| COLLECT BOTTLE | 10:43:46 | 273 | 282 | 280 | 270 |
| COLLECT BOTTLE | 10:44:46 | 273 | 281 | 280 | 270 |
| COLLECT BOTTLE | 10:45:46 | 273 | 281 | 280 | 270 |
|  | 10:46:46 | 273 | 281 | 280 | 270 |

FIG. 7

INJECTION METHOD AND INJECTION APPARATUS FOR MOLTEN RESIN, AND INJECTION STRETCH BLOW MOLDING MACHINE USING INJECTION APPARATUS

CROSS-REFERENCE TO RELATED APPLICATION

This application claims priority to Japanese Patent Application No. 2020-087318, filed May 19, 2020, entitled "INJECTION METHOD AND INJECTION APPARATUS FOR MOLTEN RESIN, AND INJECTION STRETCH BLOW MOLDING MACHINE USING INJECTION APPARATUS", the entirety of which is incorporated herein.

FIELD

The present invention relates to an injection method and an injection apparatus for injecting a molten resin, and an injection stretch blow molding machine for molding a hollow body with the injection apparatus.

BACKGROUND

As a conventional machine for producing hollow bodies made of a synthetic resin such as PET bottles, there is an injection stretch blow molding machine that shapes preforms into hollow bodies by a hot parison method. This injection stretch blow molding machine has an injection molding section, a blow molding section, and an ejection section. These functional sections are positioned in this order in a circle, equally spaced apart. In the injection molding section, a resin is melted and injected into an injection molding mold to form a preform. In the blow molding section, the preform is placed in a blow molding mold and is stretched and blown by compressed air into a hollow body. In the ejection section, the hollow body is ejected from the molding machine.

The injection stretch blow molding machine sequentially and continuously performs injection molding, blow molding, and ejection processes. One cycle of the molding process to produce a hollow body involves the injection molding process, the blow molding process, and the ejection process. Thus, the hollow body is produced and ejected from the ejection section with each molding cycle.

The injection molding process involves melting a resin material from an injection apparatus and injecting the molten resin into the injection molding mold in the injection molding section to produce a preform that can be stretched and blown at high temperatures.

In the blow molding process, the preform from the injection molding section is transferred to the blow molding section with a lip mold and placed in the blow molding mold. The preform is then stretched lengthwise with a stretching rod. In addition, the machine blows compressed air (blow air) from a blowing equipment into the preform, so that the preform is inflated into a hollow body.

In the ejection process, the hollow body is transferred from the blow molding section to the ejection section with the lip mold. When the lip mold moves to the ejection section, the lip mold, which is a split mold, opens to drop the hollow body and the hollow body is carried out of the molding machine as described above.

After the hollow body is ejected from the machine, the lip mold returns to the injection molding mold of the injection molding section. Then, the entire cycle is restarted: the molten resin is injected to produce a preform, the preform is stretched and blown into a hollow body, and the hollow body is ejected from the machine. A lip mold supports and transfers the preform or the hollow body from each section to the next.

Thus, in the injection stretch blow molding machine having the above-mentioned configuration, three lip molds are positioned at three respective positions on a single rotary plate so as to correspond to the injection molding section, the blow molding section, and the ejection section. The rotary plate rotates at a predetermined angle (120 degrees) and stops to descend and ascend, so that the respective lip molds sequentially move among the injection molding section, the blow molding section, and the ejection section, returning to their respective original positions after each cycle. After that, the injection stretch blow molding machine is configured to repeat the same molding cycle.

It should be noted that the foregoing and following descriptions show examples in which only one preform is handled, but depending on the scale of the machine, the machine may be able to handle multiple preforms and hollow bodies at once.

The injection apparatus of the injection stretch blow molding machine plasticizes and kneads chips of a resin material fed from a feed hopper, and injects the resulting molten resin. An example of the injection apparatus may include an in-line screw type injection apparatus in which a screw is positioned in the cylinder of a barrel that it can freely rotate and slide forward and backward.

The in-line screw type injection apparatus, controlled by the action of the screw, injects the molten resin into the injection molding mold, applies a holding pressure, and metering the resin per injection cycle. The time of one injection cycle by the injection apparatus is configured to take as long as the time corresponding to the injection molding process of the molding cycle for the hollow body performed by the injection stretch blow molding machine.

Incidentally, the in-line screw type injection apparatus is not limited but used in the injection stretch blow molding machine described above to be connected to the injection molding mold. Many in-line screw type injection apparatuses are used to produce molded articles as final products in molds. Such in-line screw type injection apparatuses have been improved with various contrivances. Patent Literature 1 proposes one of these contrivances.

Patent Literature 1 describes a screw disposed within the cylinder of a barrel, the screw including a supply section, a compression section, and a metering section. Patent Literature 1 describes that a resin material is not supplied uniformly from a feed hopper at the supply section to the compression section. This greatly varies the resin temperatures of the plasticized molten resin. Further, when the resin temperature greatly changes, the device loses plasticizability, and thus productivity as well.

In order to solve the above-mentioned problem, Patent Literature 1 proposes that the screw is rotated and advanced from the time of starting injection, which prevents the resin material from entering the starvation state (insufficient state) in the supply section.

Further, Patent Literature 1 describes that the screw is advanced without rotation at the time of injection and is moved backward while rotating before ending the application of the holding pressure. Then, the rotation at that time can feed the resin material sparsely in the supply section until saturated.

PRIOR ART LITERATURE

Patent Literature 1: Japanese Patent Application Laid-Open No. Hei. 09-109200

As described above, the injection apparatus combined with the injection stretch blow molding machine supplies a resin material from the feed hopper to the cylinder in which the screw is disposed. It further kneads the resin material, while plasticizing, and meters the resin material by rotation and backward movement of the screw. Then, the molten resin is injected and filled into the injection molding mold by the advancement of the screw. When the injection molding mold is completely filled with the molten resin, the advancement of the screw is stopped and the pressure is held in this state.

Further, in recent versions of injection stretch blow molding machines, there is an attempt to increase the production efficiency of the hollow bodies by releasing the preform earlier from the injection molding section to shorten the time of the injection molding process, the blow molding process, and the ejection process.

However, even if the preform is released earlier from the injection of the molten resin, it is difficult to shorten the time of the injection molding process in the injection molding section. This matter will be described below.

The time of the injection molding process in the injection molding section can be divided into three parts: injection time, cooling time, and dry cycle. These parts can be explained as follows:

(1) Injection time (filling time+holding pressure time): a molten resin is injected and filled into an injection molding mold;
(2) Cooling time: after injection filling of the molten resin is completed, the preform is cooled to lower the temperature of the molten resin so that it can be released from the mold; and
(3) Dry cycle: the mechanism of the injection molding section is operated such that the split mold opens, the rotary plate rotates, the split mold closes and the like operations.

On the other hand, the injection apparatus, which feeds the molten resin to the injection molding section, is configured to perform the following operations within the time corresponding to the injection molding process:

(a) causing the screw to move forward from the injection start position to inject a preset amount of the molten resin into the injection molding mold for filling;
(b) stopping the forward movement of the screw when the screw reaches the abutment position, and performing the holding pressure operation; and
(c) metering the resin while plasticizing the resin material (that is achieved by causing the screw to move backward while rotating, and to feed the preset amount of the molten resin to the front of the screw).

When the injection molded preform is released earlier, the total time of the injection time (1) and the cooling time (2) is shortened.

As described above, one cycle of the injection molding process consists of the injection time (=filling time+holding pressure time), the cooling time, and the dry cycle. Therefore, when the total time of the injection time (1) and the cooling time (2) can be shortened, it is possible to shorten the time of one cycle of the injection molding process.

On the other hand, a conventional injection apparatus performs the metering within the time period ensured by the cooling time and the dry cycle at the injection molding section.

However, when the time of the injection molding process is shortened, the time from the start of the injection of the molten resin to the end of the metering in the injection apparatus, i.e., the time required for one cycle of the injection cycle including "filling," "holding pressure," and "metering" does not fall within the time of one cycle of the injection molding process. It should be noted that this injection apparatus is configured such that the screw does not rotate when filling the molten resin and applying the holding pressure.

To avoid the foregoing problem, for example, the injection apparatus is adjusted to cause a partial delay in the dry cycle, so that the operation of the injection apparatus is allowed to be accommodated in the time corresponding to the injection molding process. The partial delay may be such that, for example, the timer includes a start time of nozzle advancement to generate the time corresponding to the nozzle touch operation. Therefore, early release of the preform cannot be fully exploited.

As another countermeasure, it is conceivable to increase the number of screw revolutions per unit time.

Because the time required for the resin material to move from the supply section of the screw to the front side of the screw is decreased, however the time that the resin material is exposed to heat from the heaters attached to the barrel also decreased. As a result, the resin material does not melt sufficiently.

As a result, the molten resin can become uneven due to melting failure.

As an additional countermeasure to insufficient melting of the resin, the set temperature of the barrel can be increased. There is a problem however, if the resin temperature is too high. The increase in temperature of the resin and preform can be offset by increasing the injection cooling time. Overall, however, this increases the time of one cycle.

Therefore, the present inventor has studied intensively to provide effective measures for a method that does not require the set temperatures to be raised.

SUMMARY

Technical Problem

In view of the above-mentioned circumstances, the present invention is aimed at providing an injection apparatus configured to feed a molten resin into an injection molding section of an injection stretch blow molding machine, in which plasticizing and kneading of the resin for the next injection are simultaneously started at the time of starting injection, so that metering can be completed earlier, and a delay is not caused in the dry cycle. As a result, it is an object of the present invention to shorten the molding cycle for a hollow body in the injection stretch blow molding machine.

Solution to Problem

The present invention has been made in consideration of the above-mentioned problems, and is a method for injecting a molten resin by an in-line screw type injection apparatus configured to perform filling, holding pressure, and metering.

The injection method includes injecting a molten resin by rotating and advancing a screw, which has been positioned in an injection start position, for filling, and holding pressure and metering while rotating the screw continuously from the filling, which are performed in this order as an injection cycle.

Herein, at the start of the filling for each injection cycle, plasticizing and kneading for generating the molten resin for injection in the next injection cycle are started, and during the filling, the plasticized and kneaded molten resin to be injected in the next injection cycle is not fed ahead of the screw forward.

In the aspect of the present invention described above, the number of screw revolutions per unit time among the filling, the holding pressure, and the metering may be variable.

According to another aspect of the present invention, there can be provided an injection apparatus configured to inject a molten resin that is an in-line screw type injection apparatus configured to perform filling, holding pressure, and metering.

The injection apparatus operates in an injection cycle in which injecting a molten resin by rotating and advancing a screw, which has been positioned in an injection start position, for filling, and holding pressure and metering while rotating the screw continuously from the filling are performed in this order.

Herein, at the start of the filling for each injection cycle, the injection apparatus starts plasticizing and kneading for generating the molten resin for injection in the next injection cycle, and during the filling, the plasticized and kneaded molten resin to be injected in the next injection cycle is not fed ahead of the screw forward.

In the aspect of the present invention described above, the number of screw revolutions per unit time among the filling, the holding pressure, and the metering may be variable.

Yet another aspect of the present invention is an injection stretch blow molding machine including an injection molding section configured to mold a preform, a blow molding section configured to stretching and blowing the molded preform to shape a hollow body, and an ejection section configured to eject the hollow body formed by the blow molding section from the molding machine.

Herein, the injection molding section includes an injection molding mold and the injection apparatus described above configured to inject a molten resin into the injection molding mold.

In the aspect of the present invention described above, it is preferable that the injection molding section simultaneously start injecting in an injection molding process in a molding cycle and generating the molten resin for injection in an injection molding process in the next molding cycle.

Advantageous Effects of Invention

According to the present invention, the screw having been retracted in the injection start position moves forward while rotating to inject the molten resin. Then, when the rotating screw reaches the abutment position to finish filling the preset amount of the molten resin, the screw while rotating performs the holding pressure continuously from the filling without stopping the rotation. Herein, the holding pressure is to apply a pressure to the resin injected into the mold so that the resin does not flow back through the gate, thereby suppressing the occurrence of sink in the molded article. When the holding pressure is completed, metering while rotating the screw continuously from the holding pressure without stopping the rotation is performed. Herein, the metering is achieved by moving the screw backward while the screw rotates, so as to feed a preset amount of the molten resin ahead of the screw forward.

Since the screw thus at the injection start position advances while rotating, the rotation of the screw is performed simultaneously with the time of starting injection.

Since the screw rotates simultaneously with the time of starting injection, plasticizing and kneading for generating the molten resin for a next shot (i.e., accumulation of the molten resin for the next injection cycle) proceeds from the time of starting injection. Therefore, the generation of the molten resin for the next shot can be started earlier.

Furthermore, as compared with the case of starting the plasticizing and kneading for the next shot by rotating the screw from the time of starting holding pressure in the injection apparatus, and also as compared with the case of completing the holding pressure as in the conventional manner and starting the plasticizing and kneading for the next shot from the time of starting metering which is performed by moving the screw backward, the molten resin for the next shot can be generated and completed earlier.

Thus, the time for one injection cycle in the injection apparatus consisting of filling, holding pressure, and metering (which is the time for generating the molten resin for the next shot) can be shortened (the process is completed earlier) or made longer than that in the conventional method.

According to the present invention, the continuous rotation of the screw can constantly give shearing heat to the resin. In addition, the screw can rotate at the number of screw revolutions corresponding to the filling, holding pressure, and metering, so that it is possible to continuously give the shearing heat favorably. Since the time during which the screw has not been rotated in the conventional art can be used as the rotation time, which is the time overlapping the other operations. Thus, the plasticizing and kneading time in the same single cycle can be lengthened. Thus, it is possible to generate a molten resin which is distributed over the entire sections for injection molding uniformly in temperature as well as in density.

Further, according to the present invention, the injection apparatus is configured such that the screw that has been retracted in the injection start position moves forward while rotating, to inject a molten resin. Then, when the rotating screw reaches the abutment position and the preset amount of the molten resin is filled, the holding pressure is achieved while the screw rotates continuously from the filling without stopping the rotation. When the holding pressure is completed, metering is performed while the screw rotates continuously from the holding pressure without stopping the rotation.

Since the screw in the injection start position is advanced while rotating, the injection apparatus controls to rotate the screw at the same time as the time of starting injection.

Since the screw is rotated at the same time as the start of injection, plasticizing and kneading for generating the molten resin for the next shot proceed from the time of starting injection. Therefore, the generation of the molten resin for the next shot can be started earlier.

Furthermore, as compared with the case of starting the plasticizing and kneading for the next shot by rotating the screw from the time of starting holding pressure in the injection apparatus, and also as compared with the case of completing the holding pressure as in the conventional manner and starting the plasticizing and kneading for the next shot from the time of starting metering which is performed by moving the screw backward, the molten resin for the next shot can be generated and completed earlier.

Thus, the time for the one injection cycle consisting of filling, holding pressure, and metering (which is the time for generating the molten resin for the next shot) can be shortened (the process is completed earlier) or made longer than that in the conventional method.

According to the present invention, the continuous rotation of the screw can constantly give shearing heat to the resin. In addition, the screw can rotate at the number of screw revolutions corresponding to the filling, holding pressure, and metering, so that it is possible to continuously give the shearing heat favorably. Since the time during which the screw has not been rotated in the conventional art can be used as the rotation time, which is the time overlapping the other operations. Thus, the plasticizing and kneading time in the same cycle can be lengthened. Thus, it is possible to generate a molten resin which is distributed over the entire sections for injection molding uniformly in temperature as well as in density.

Since the time for one injection cycle in the injection apparatus consisting of filling, holding pressure, and metering can be shortened (the process is completed earlier), it is possible to shorten the time required for one cycle of the injection molding process. Therefore, the time required for the molding cycle for a hollow body can be shortened, so that the production efficiency of the hollow body can be increased.

Further, according to the present invention, the time required for the injection molding process in each molding cycle for a hollow body can be shortened. Therefore, the time required for the molding cycle for a hollow body can be shortened, so that the production efficiency of the hollow body can be increased.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 6 includes tables showing variation in the weight of the molded article measured, variation in molding operation times for every shot, and barrel temperature change between the shots in the practical example in the test.

FIG. 7 includes tables showing variation in the weight of the molded article measured, variation in molding operation times for every shot, and barrel temperature change between the shots in the comparative example in the test.

DETAILED DESCRIPTION

Figure 1:
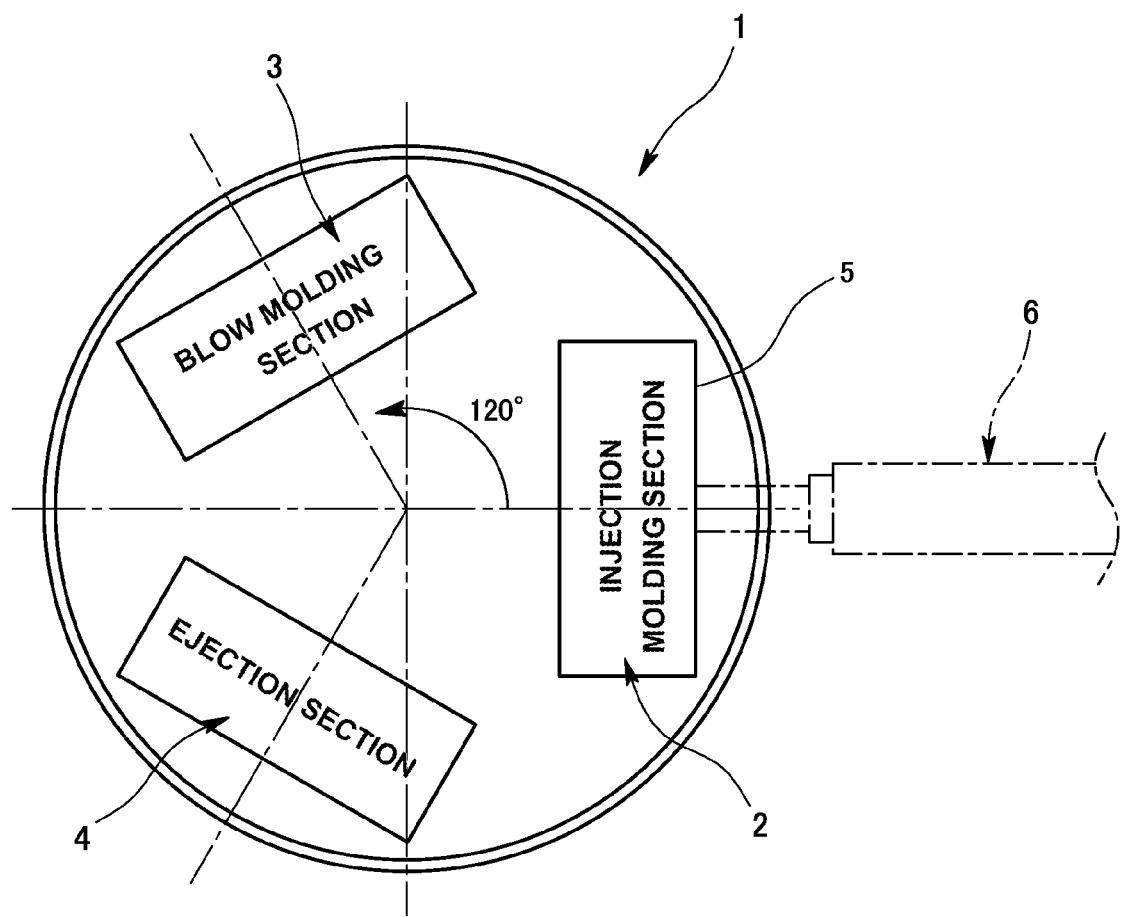
FIG. 1 is an explanatory plan view schematically illustrating an example of an injection stretch blow molding machine.

Injection Stretch Blow Molding Machine:

Next, the present invention will be described in detail on the basis of an embodiment illustrated in FIGS. 1 to 7. In the drawing, reference numeral 1 denotes an injection stretch blow molding machine configured to produce a hollow body made of a synthetic resin. The injection stretch blow molding machine 1 includes an injection molding section 2, a blow molding section 3, and an ejection section 4 arranged in this order at an angle of 120 degrees so that they are arranged in a circle, equally spaced apart as illustrated in FIG. 1.

The injection molding section 2 is configured to inject a molten resin into an injection molding mold to mold a preform that maintains its high temperature. In particular, the injection stretch blow molding machine 1 of the present embodiment is configured such that the preform can be released earlier in a state in which the preform is able to be stretched and blown in the blow molding section 3.

The molded preform is released while being held with a lip mold that is incorporated as a part of the injection molding mold. Then, it is transferred to the blow molding section 3 and placed in the blow molding mold. The blow molding section 3 is configured to stretch the preform held by the lip mold and blown the same with high pressure air or the like to mold a hollow body.

The blow-molded hollow body is transferred to the ejection section 4 while being held with the lip mold. The ejection section 4 is configured to eject the hollow body formed in the blow molding section 3 from the molding machine. When the lip mold moves from the blow molding section 3 to the ejection section 4, the lip mold as a split mold opens to release the constraint on the hollow body.

As described above, the hollow body detached from the lip mold is ejected from the molding machine. Then, the lip mold having released the hollow body returns to the injection molding section 2, so as to be incorporated into the injection molding mold for a preform as a part thereof.

Therefore, the injection stretch blow molding machine 1 as described above is configured such that the preform molded in the injection molding section 2 is transferred to the blow molding section 3 with the lip mold, and stretched and blown into the hollow body in the blow molding section 3. Then the hollow body is transferred to the ejection section 4 with the lip mold, where the lip mold releases the hollow body.

Figure 2:
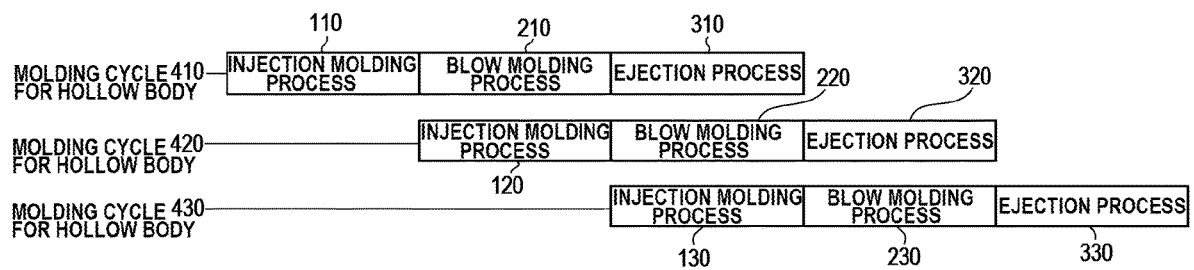
FIG. 2 is an explanatory view schematically illustrating the progress of the molding cycle of the injection stretch blow molding machine.

Molding Cycle:

In the injection stretch blow molding machine 1, as illustrated in FIG. 2, the following processes are continuously performed as a series of steps: injection molding processes 110, 120, 130, . . . for injection molding a preform; blow molding processes 210, 220, 230, . . . for stretching and blowing the preform to the hollow body as described above; and ejection processes 310, 320, 330, . . . for ejecting the hollow body from the molding machine in the ejection section. In the present embodiment, the injection molding processes 110, 120, 130, . . . , the blow molding processes 210, 220, 230, . . . , and the ejection processes 310, 320, 330, . . . , are combined into molding cycles for hollow body 410, 420, 430, . . . , respectively.

The lip mold moves for the above-described operations from the injection molding section 2, to the blow molding section 3, and then to the ejection section 4. The lip mold finally returns to the injection molding section 2 in order to repeat molding cycles 410, 420, 430, . . . for the hollow body.

In the injection stretch blow molding machine 1, three lip molds are used and arranged at three positions so that they align with the injection molding section 2, the blow molding section 3, and the ejection section 4 at the same time. The three lip molds are assembled to a rotary plate, which rotates 120 degrees in one direction and stay there. The rotary plate descends, and lifts after the injection and cooling are completed. Then, the rotary plate rotates further 120 degrees in the one direction and repeats. In this manner, the lip molds rotate through each position sequentially.

Accordingly, in the injection stretch blow molding machine 1, the three lip molds move among three positions, thereby processing through multiple molding cycles for a hollow body simultaneously while one stage apart.

FIG. 2 schematically shows a state in the injection stretch blow molding machine 1 in which a molding cycle 410 as a single molding cycle for a hollow body and a next molding cycle 420 are simultaneously in process though one stage apart. As described above, the molding cycle 410 as the single molding cycle includes the injection molding process 110, the blow molding process 210, and the ejection process 310 in succession. The next molding cycle 420, which occurs one stage behind the molding cycle 410, includes the injection molding process 120, the blow molding process 220, and the ejection process 320 in succession. Moreover, the molding cycle 430, which occurs one stage behind the molding cycle 420, includes the injection molding process 130, the blow molding process 230, and the ejection process 330 in succession.

As illustrated in FIG. 2, the injection stretch blow molding machine 1 is configured to mold hollow bodies by the respective molding cycles 410, 420, 430, . . . while they occur one stage behind the previous molding cycle.

As illustrated in FIG. 1, the injection molding section 2 includes an injection molding mold 5 and an injection apparatus 6. The injection apparatus 6 is configured to inject a molten resin into the injection molding mold 5 in each of the injection molding processes 110, 120, 130, . . . .

Note that although the injection molding mold 5 is composed of a lip mold, an injection core mold, and an injection cavity mold (also including a hot runner device or the like), FIG. 1 represents the injection molding mold 5 showing a position where the injection cavity mold is located. Also note that neither the lip molds that are moved and stopped to be set on the injection cavity mold nor the injection core mold that enters the inside of the injection cavity mold are shown to facilitate the description of the arrangement of the injection molding section 2.

Figure 3:
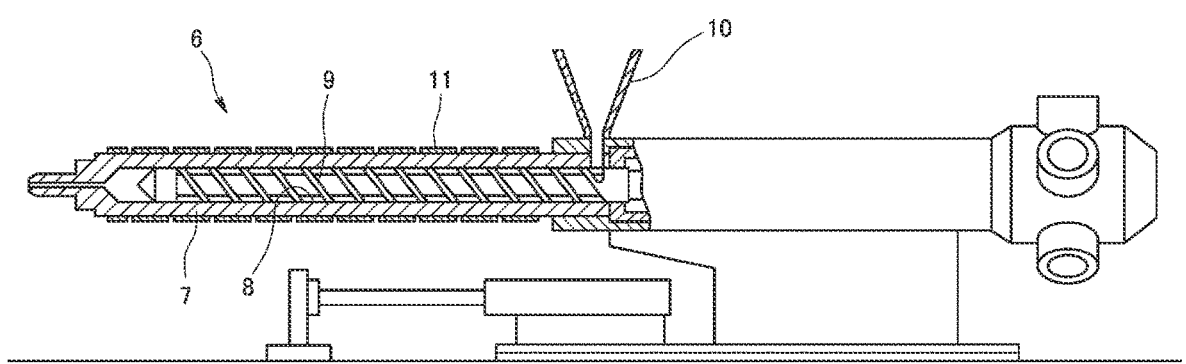
FIG. 3 is an explanatory view schematically illustrating an example of an injection apparatus.
Figure 4:
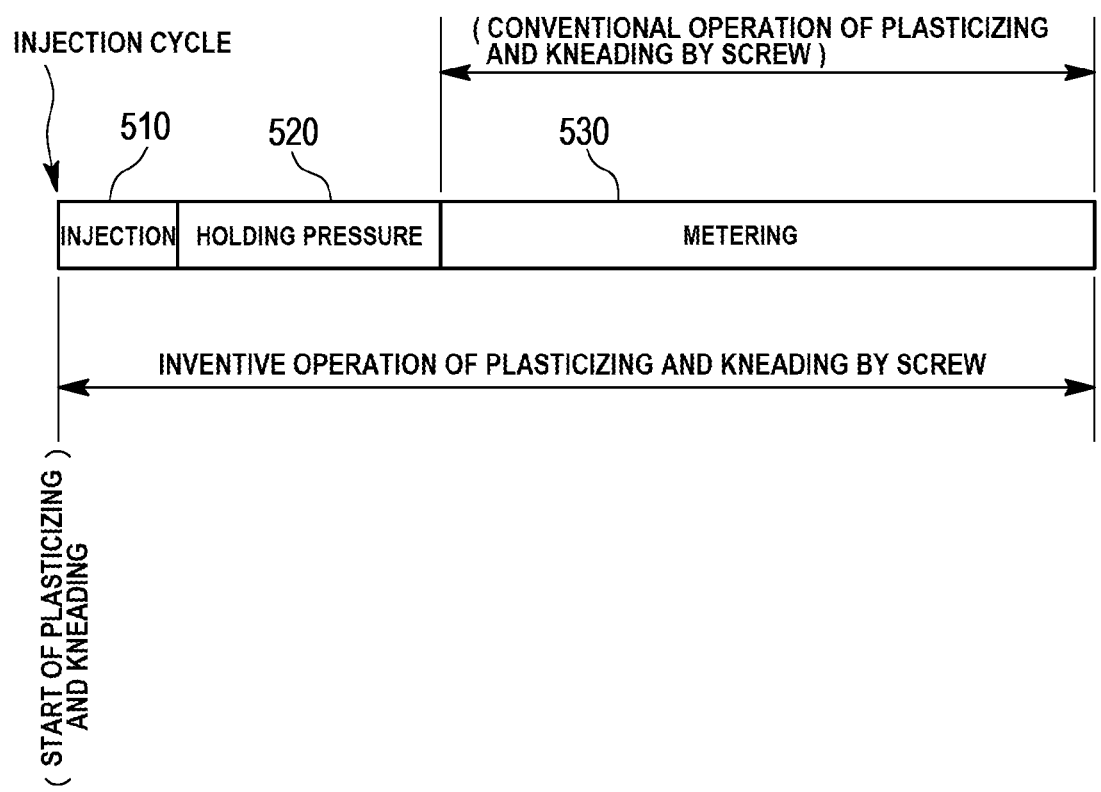
FIG. 4 is an explanatory view schematically illustrating an injection cycle of the injection apparatus.

Injection Apparatus:

FIG. 3 schematically shows the injection apparatus 6. The injection apparatus 6 is an in-line screw type apparatus which has a barrel (heating cylinder) 7 having a cylinder 8, and a rotatable screw 9 in the cylinder 8. The screw 9 can freely rotate and move forward and rearward.

The injection apparatus 6 supplies the chips of a resin material from a feed hopper 10 to the supply section of the screw 9, and causes the screw 9 to move the supplied resin material from the compression section to the metering section.

Shear heat is generated by this movement. In addition to the shear heat, heating by a heater 11 as well as mixing by screw rotation can plasticize and knead the resin material to generate a molten resin.

The generated molten resin is fed ahead of the screw 9 forward. Thus, the molten resin positioned in front of the screw 9 is injected into the injection molding mold 5. The heater 11 for facilitating plasticization of the resin material is disposed on the outer periphery of the barrel 7.

During each of the injection molding processes 110, 120, 130, . . . in the molding cycles 410, 420, 430, . . . , the injection apparatus 6 performs feeding the molten resin into the injection molding mold (filling 510), suppressing backflow while maintaining an application of pressure to the molten resin having been fed into the injection molding mold (holding pressure 520), and feeding a preset amount of the molten resin for injection to the front of the screw 9 (metering 530). Filling 510, holding pressure 520, and metering 530 are collectively referred to as an injection cycle, which is continuously repeated in a series. Thus, a single injection cycle involves injecting (filling+holding pressure) and metering (see FIG. 4). The injection cycle is repeated in accordance with the advancement of processes performed by the molding machine main body side, that is, in accordance with the advancement of the molding cycle as will be described later.

Injection in Injection Molding Process:

The screw 9 is in the injection start position when the filling 510 is performed in each of the injection molding processes 110, 120, 130, . . . in the respective hollow body molding cycles 410, 420, 430, . . . . Then, in the present embodiment, the screw 9 in the injection start position at the time of starting injection by the injection apparatus 6 moves forward while rotating. The forward movement of the rotating screw 9 can achieve the injection of a preset amount of the molten resin into the injection molding mold.

The filling 510 of the injection apparatus 6 is accomplished by applying a hydraulic pressure to move the screw 9 forward. Further, the end of the filling 510 of the preset amount of the molten resin is based on the screw position being measured. That is, when it is determined that the screw 9 reaches the switch-over position, the hydraulic pressure is switched to the back pressure for holding pressure. It should be noted that the screw 9 of the injection apparatus 6 of the present invention is not forcibly stopped by a stopper or any similar mechanism when it reaches the abutment position.

In the injection apparatus 6, as described above, the screw 9 rotates, for example, from the time of starting injection within the injection molding process 110 of the molding cycle 410. The rotation of the screw 9 starts the generation of the molten resin for the filling 510 in the injection molding process 120 in the next molding cycle 420. That is, the start of injection and the start of generation of the molten resin for the next shot are adjusted at the same time.

During the filling 510, a hydraulic pressure is applied to screw 9 in order to advance the screw 9. The increased back pressure from the resin in front of the screw (injection pressure) closes a check ring (ring-shaped check valve located at the tip of the screw). Therefore, even when the generation of the molten resin is started by the rotation of the screw 9, the molten resin does not flow from the metering section to the front of the screw.

Holding Pressure in Injection Molding Process:

After completing the filling 510 of the molten resin in each of the injection molding processes 110, 120, 130, . . . , the injection apparatus 6 performs the holding pressure 520 while rotating the screw 9 continuously from the operation of the filling 510. In addition, in the injection molding mold of each of the injection molding processes 110, 120, 130, . . . , a transition is made from injection filling to cooling, so that the preform made of the molten resin is cooled.

In the injection apparatus 6, the back pressure set for holding pressure at the time of holding pressure 520 is applied to the screw 9. Then, the screw 9 continues to rotate from the filling 510, and continues to generate the molten resin for the next shot.

Metering in Injection Molding Process:

After completing the holding pressure 520 of the molten resin in each of the injection molding processes 110, 120, 130, . . . , the injection apparatus 6 moves the screw 9 backward while rotating the screw 9 continuously from the screw rotation operation at the holding pressure 520, thereby performing the metering 530.

The operation of the injection apparatus 6 for the metering 530 falls within the dry cycle time involving the mold opening, rotation, and mold closing at the injection molding section 2.

During the metering 530 of the injection apparatus 6, the screw 9 moves backward while rotating when back pressure is applied to it. Thus, during the metering 530, the screw 9 plasticizes and kneads the resin material as described above to feed a preset amount of molten resin ahead of the screw 9 forward. When the screw 9 moves backward and reaches the injection start position while feeding a preset amount of molten resin ahead of the screw forward, the backward movement is stopped.

In the present embodiment, if the screw 9 moves backward to the injection start position, the rotation of the screw 9 is stopped. However, it is also possible to remain rotate while in that position.

In the injection molding section 2 of the injection stretch blow molding machine 1, when the injection molding process 110 of the molding cycle 410 for a hollow body is completed, the injection molding process 120 of the next molding cycle 420 is performed. Then, the injection apparatus 6 in the injection molding process 120 performs again the operation of the filling 510, the holding pressure 520, and the metering 530. As described above, at the time of the filling 510 for the injection molding process, the plasticizing and kneading operations for the generation of the molten resin for the next shot (the amount to be injected in the next injection molding process 130) is started at the same time as described above.

In the injection apparatus 6 of the present embodiment, since the plasticizing and kneading for generating the molten resin for the next shot proceeds from the time of starting injection, the generation of the molten resin for the next shot can be started earlier than in the conventional injection apparatus in which the screw is started to rotate after the pressure holding is completed. Thus, the injection apparatus 6 of the present embodiment can finish the generation of the molten resin for the next shot earlier than the conventional injection apparatus.

Furthermore, the injection stretch blow molding machine 1 can shorten the time required for each of the injection molding processes 110, 120, 130, . . . in the respective molding cycles 410, 420, 430, . . . for the hollow bodies that are performed one stage behind the former process. Thus, the time required for the molding cycles 410, 420, 430, . . . for the hollow bodies is shortened, so that the production efficiency thereof is increased.

In the injection apparatus 6 of the present embodiment, the screw 9 continuously rotates in the filling 510, the holding pressure 520, and the metering 530. However, the number of screw revolutions per unit time is not necessarily equal among the filling 510, the holding pressure 520, and the metering 530. The number of screw revolutions per unit time is variable in each of the filling 510, the holding pressure 520, and the metering 530, and can be independently set.

It should be noted that the number of screw revolutions per unit time for the filling 510, the holding pressure 520, and the metering 530 may differ. Also, the number of screw revolutions per unit time may be changed during each of the filling 510, the holding pressure 520, and the metering 530.

Practical Examples

Test Method:

An exemplary injection stretch blow molding machine for molding bottles that implements the present invention and another for comparative example were prepared for test. The test will now be described.

Bottles produced by the injection stretch blow molding machines according to the practical example and the comparative example were made of polyethylene terephthalate (PET). The weight of the bottle was set to 96.5 g. An injection molding mold for simultaneously producing four bottles at a time was used for both the practical example and the comparative example. The bottles produced by the following two molding methods of the practical example and the comparative example were evaluated on the basis of qualities and molding data.

First, molding conditions for molding a good bottle were searched for with the injection stretch blow molding machine of the practical example. The injection stretch blow molding machine of the practical example was controlled such that the operation of plasticizing and kneading the resin material by rotating the screw to generate the molten resin was started at the same time as the start of the injection time set in the injection molding process in the injection molding section (at the same time when injection of the injection apparatus is started).

In addition, the time for the operation of generating the molten resin (rotation of the screw) was set to correspond to the time taken for one cycle (injection cycle) of the injection apparatus within the time corresponding to the injection molding process of the molding cycle of the bottle (i.e. molding cycle of the hollow body). Specifically, the number of screw revolutions was set at 38 rpm.

Comparative Example

In this comparative example, the injection stretch blow molding machine starts rotation of the screw only after applying holding pressure as in the conventional molding method. That is, the injection stretch blow molding machine starts metering the molten resin by rotating the screw only after applying holding pressure.

In this comparative example, the number of screw revolutions for metering after pressure holding was the same as that of the practical example (38 rpm).

Test Results of Practical Example:

The time of the injection molding process in the molding cycle of the injection stretch blow molding machine of the practical example was 14.9 seconds, which includes 5.50 seconds for injection, 5.00 seconds for cooling, and 4.40 seconds for the dry cycle.

The number of screw revolutions for generating the molten resin was 38 rpm as described above.

The PET bottle was a conforming article and transparent.

The injection apparatus in the practical example started rotation of the screw at the same time as the time of starting injection, and the injection filling time in the injection molding section was the same 1.75 seconds as for the comparative example (conventional molding method).

As described above, the injection filling time of the practical example in the injection molding section and the injection filling time of the comparative example both last 1.75 seconds. Therefore, in the practical example, it is considered that the molten resin is not fed ahead of the screw forward while it is being injected.

Figure 5:
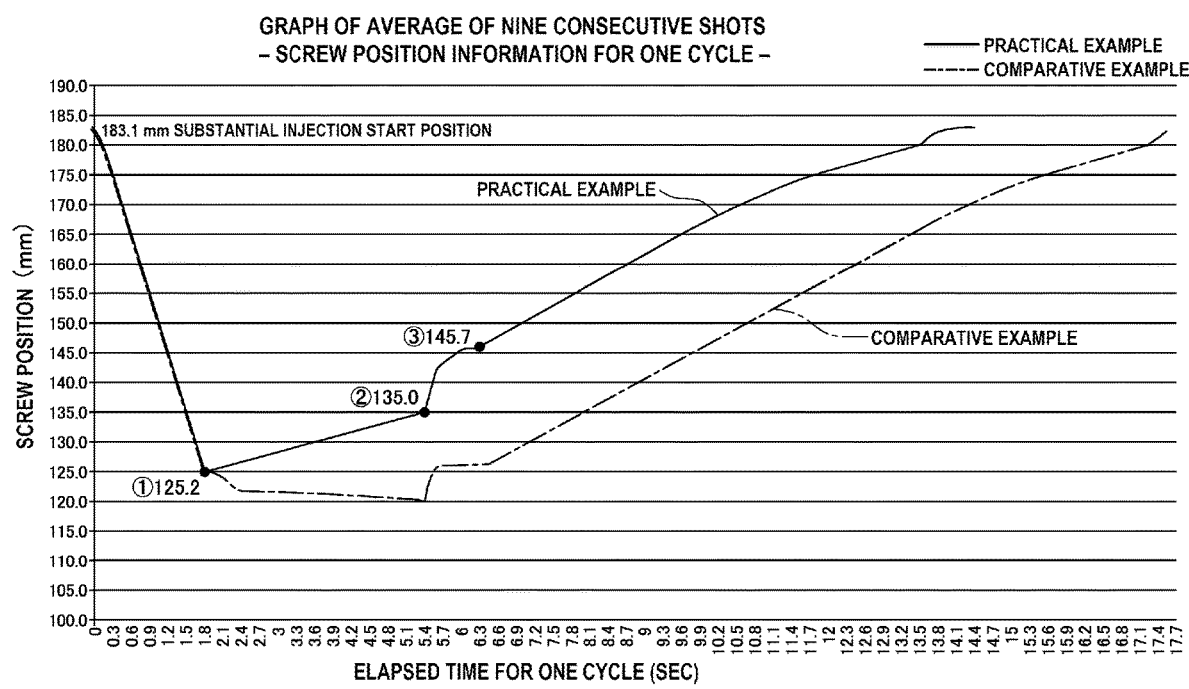
FIG. 5 is a graph as an explanatory view showing one cycle of the screw moving position information of a practical example and a comparative example in a test.

In the practical example, the graph of FIG. 5 shows that once at the abutment position (encircled number 1) and the molten resin has been completely injected, the screw moves backward. The screw is still rotating to generate the molten resin, however, it is considered that the molten resin is fed ahead of the screw forward. In this way, metering can start immediately after the previous injection.

The metering time of the injection apparatus in the practical example was 12.07 seconds. This is calculated by adding the difference, 3.75 seconds, between the injection time and the injection filling time (5.50-1.75) to the metering time, 8.32 seconds, that occurs between the cooling time and the dry cycle. See the graph of FIG. 5.

The metering stroke of the screw rotating during the injection time (i.e., filling and pressure holding) was 20.5 mm (145.7-125.2), which is 35% of the injection stroke 57.9 mm (183.1-125.2). See the graph of FIG. 5.

The standard deviation (not shown) of the resin pressure fluctuation in the barrel nozzle was calculated using nine consecutive shots for the bottle for quality inspection, but it was not significantly large, so it may be considered practically consistent.

Test Results of Comparative Example:

This comparative example is a molding method in which the metering is performed by rotating the screw only after applying holding pressure in the injection apparatus.

The time of the injection molding process in the molding cycle of the injection stretch blow molding machine of the comparative example was 18.1 seconds. When the number of screw revolutions was 38 rpm, which is the same as in the above-described practical example, the metering could not be performed within the time for the injection molding process in the practical example. Therefore, the time of the injection molding process in the comparative example was set to 18.1 seconds.

The qualities of the bottles produced by the comparative molding method were similar to those produced by the molding method according to the practical example.

Graph of FIG. 5:

In the graph of FIG. 5, a solid line indicates the practical example whereas a dashed-dotted line indicates the comparative example.

As shown in FIG. 5, the screw abutment position of the practical example is 125.2 mm, the position at the injection end time where the screw sits during pressure holding is 135.0 mm, and the screw-back position to where the screw returns to after the holding pressure is applied is 145.7 mm.

That is, the metering stroke of the practical example during the injection time (filling and holding pressure time and time for screw-back) is 20.5 mm (This is calculated by finding the difference between "screw-back position: 145.7 mm" and "screw abutment position: 125.2 mm").

Note that the screw abutment position is the same for both in the practical example and the present comparative example.

If the molten resin is stored ahead of the screw forward during the filling of the practical example, the screw should be rearward of this screw abutment position.

Since the screw abutment position is the same for both in the practical example and the comparative example, it is inferred that the resin feed ahead of the screw forward is not performed during filling.

The tables of FIGS. 6 and 7 show the molding data (i.e., variations in bottle weights and barrel temperatures) obtained for the nine consecutive shots. FIG. 6 shows the results of the practical example, and FIG. 7 shows that of the comparative example. In barrel temperature setting, F section indicates the temperature set value at the barrel front, M section indicates the temperature set value at the barrel center, and R section indicates the temperature set value at the barrel rear.

As is clear from the comparison between the practical example and the comparative example, the present invention can complete one injection cycle of the injection apparatus earlier. Therefore, the time required for the molding cycle of the hollow body by the injection stretch blow molding machine is also shortened, thereby enhancing the production efficiency of the hollow body.

The above-described embodiments and the practical example illustrate aspects of the present invention, and the present invention is not limited to the above-described embodiments and practical examples.

REFERENCE SIGNS LIST

1 injection stretch blow molding machine
2 injection molding section
5 injection molding mold
6 injection apparatus
7 barrel
8 cylinder
9 screw
10 feed hopper
11 heater
410, 420, 430 molding cycle for hollow body
110, 120, 130 injection molding process
210, 220, 230 blow molding process
310, 320, 330 ejection process
510 injection
520 holding pressure
530 metering

What is claimed is:

1. A method for injecting a molten resin using an in-line screw type injection apparatus, which is connected to an injecting molding mold, the method being configured to perform an injection cycle more than once, the injection cycle including, in this order, filling a molten resin into the injection molding mold while rotating and advancing a screw which begins in an injection start position, and holding pressure and metering while rotating the screw continuously from the filling, wherein:
   the injection apparatus contains a molten resin to be filled into the injection molding mold for an injection cycle (A) within the injection cycles performed more than once and a molten resin to be filled into the injection molding mold for an injection cycle (B) performed directly following the injection cycle (A);
   the screw in the injection apparatus containing these molten resins is rotated and advanced where the advancement is at a constant rate to a switch-over position, so that the molten resin to be filled for the injection cycle (A) is advanced and simultaneously the molten resin to be filled for the injection cycle (B) is plasticized and kneaded;
   during the filling in the injection cycle (A), the molten resin to be filled in the injection molding mold for the injection cycle (B) does not flow to a front side more than a tip of the screw; and
   in the filling in the injection cycle (A), immediately after the screw reaches the switch-over position to when the screw reaches a pressure holding, the molten resin in the injection cycle (B) is fed forward of the screw thereby constantly moving the screw rearwardly immediately after the screw reaches the switch-over position to when the screw reaches the pressure holding.

2. The method for injecting a molten resin according to claim 1, wherein a number of screw revolutions per unit time for each of the filling, the pressure holding and the metering is different from one another.

* * * * *